J. A. Mason.
Fastening Teeth.
No 74237  Patented Feb. 11, 1868

Witnesses.
A. S. Campbell
Edw Schafer

Inventor.
J. A. Mason
by
Mason, Fenwick & Lawrence

United States Patent Office.

JOHN A. MASON, OF KEOKUK, IOWA.

Letters Patent No. 74,237, dated February 11, 1868.

---

IMPROVEMENT IN MODE OF FASTENING TEETH.

---

The Schedule referred to in these Letters Patent and making part of the same.

---

TO ALL WHOM IT MAY CONCERN:

Be it known that I, JOHN A. MASON, of Keokuk, in the county of Lee, and State of Iowa, have invented a new and improved Fastening for Artificial Teeth; and I do hereby declare that the following is a full, clear, and exact description thereof, reference being had to the accompanying drawings, making part of this specification, in which—

Similar letters of reference indicate corresponding parts in the several figures.

This invention relates to a new and improved method of applying metallic fastenings to artificial teeth, whereby I secure a much stronger attachment of the teeth to their rubber base, reduce the amount of rubber hitherto found necessary about the cutting-edges of the teeth, and make a much firmer attachment of the teeth to their rubber base than has been heretofore attained.

The nature of my invention consists in the insertion of metallic fastenings into the body of the teeth in planes at right angles to the width thereof, and in having those portions of the fastenings which project from the teeth to be inserted into the "plate" or rubber base, arranged at right angles to those portions which enter the teeth, as will be hereinafter described.

To enable others skilled in the art to understand my invention, I will describe its construction and operation.

Figure 1:
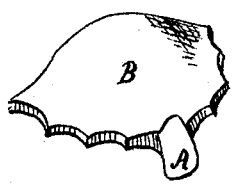
Figure 1 is a perspective view, showing a tooth attached to its base.
Figure 2:
Figure 2 is an enlarged sectional view of a tooth with my improved fastening applied to it.
Figure 3:
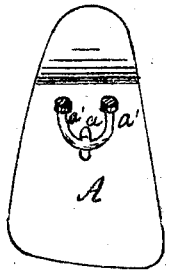
Figure 3 is a view of the inner part of the tooth and its improved fastening.
Figure 4:
Figure 4 is a perspective view of the improved fastening detached from a tooth.

In the accompanying drawings I have represented a fastening consisting of two V-shaped wires linked together and secured at right angles to each other. These two staples $a$ $a'$ present four attaching-ends, which latter may be swelled or enlarged, as shown, for the purpose of affording a better hold in the substances into which they are embedded. Instead of employing the links or staples as shown, the fastenings may be stamped from a thin plate of metal, and so shaped as to present but three attaching-ends, in which case the points should be bent or formed so as to present right-angular attachments, substantially as shown in the drawings. The staple $a$ is embedded into the tooth A in the operation of moulding the tooth, or in any other suitable manner, so that the two ends of this staple shall be in a plane lengthwise of the tooth, as shown in fig. 2; this leaves the staple $a'$, which is intended for insertion into the rubber base B, in a plane which is at right angles to the length of the tooth, as shown in fig. 3.

Figure 5:
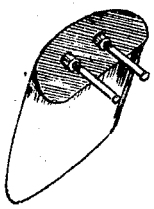
Figure 5 is a cross-section of a tooth in perspective, showing the old mode of applying fastenings.

In fig. 5, I have shown the mode heretofore adopted of inserting fastening-pins into teeth, wherein it will be seen that the pins are arranged in a plane at right angles to the length of the tooth, which arrangement greatly impairs the strength of the tooth, and renders it very liable to break at the point of insertion of the pins.

By having the fastening, which is inserted into the tooth, in a plane which is lengthwise of the tooth, and the fastening which projects from the tooth arranged at right-angles to the length of the tooth, as shown and described, I secure the following advantages over all other modes of attachment: The tooth is not liable to break crosswise of its length, because the pins in the tooth are not in the same transverse plane; and the fastening $a'$ can be secured firmly into the rubber, or other base-plate, without having too great a thickness of rubber in contact with the tooth. Where those portions of the fastenings which project from the teeth have been arranged in planes coinciding with the length of the teeth, or at right angles to the fastenings $a'$, shown in figs. 2 and 3, it requires too great a thickness of rubber near the cutting-edges of the teeth, to receive these fastenings. The fastening $a'$, being arranged at right angles to the fastening $a$, can be embedded firmly into the rubber, or other suitable base, without having too great a thickness of rubber in contact with the tooth. The same result can be attained by using a broad pin, inserted into the tooth longitudinally thereof, and bending the projecting portion of such pin so that it can be inserted latitudinally into the rubber base. The same result may be obtained by inserting pins lengthwise of the tooth when they are moulded, and afterward securing the projection which enters the rubber base to said pins by bending and pressing down their projecting ends.

Having described my invention, what I claim as new, and desire to secure by Letters Patent, is—

The construction of fastenings for artificial teeth, substantially in the manner and for the purposes described.

JOHN A. MASON.

Witnesses:
J. D. FERREE,
J. P. HORNISH.